(12) United States Patent
Baek et al.

(10) Patent No.: US 11,138,717 B2
(45) Date of Patent: Oct. 5, 2021

(54) ELECTRONIC APPARATUS AND CONTROL METHOD THEREOF

(71) Applicant: SAMSUNG ELECTRONICS CO., LTD., Suwon-si (KR)

(72) Inventors: Kwangsun Baek, Suwon-si (KR); Kimo Kim, Suwon-si (KR); Doohyun Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/902,379

(22) Filed: Jun. 16, 2020

(65) Prior Publication Data
US 2021/0166369 A1    Jun. 3, 2021

Related U.S. Application Data

(63) Continuation of application No. 16/842,319, filed on Apr. 7, 2020.

(30) Foreign Application Priority Data

Nov. 29, 2019    (KR) .......................... 10-2019-0157583

(51) Int. Cl.
*G06K 9/00*    (2006.01)
*G06T 7/00*    (2017.01)
(Continued)

(52) U.S. Cl.
CPC .......... *G06T 7/0002* (2013.01); *G06N 3/0454* (2013.01); *G06N 3/063* (2013.01);
(Continued)

(58) Field of Classification Search
CPC ......... G06T 1/0021; G06T 15/10; G06T 7/55; G06T 3/40; G06T 19/003; G06T 5/002;
(Continued)

(56) References Cited

U.S. PATENT DOCUMENTS 7,860,322 B2 * 12/2010 Lee ........................ H04N 19/15
                                                    382/232
8,031,956 B2 * 10/2011 Ali ............................ G06T 5/10
                                                    382/240
(Continued)

FOREIGN PATENT DOCUMENTS

EP        3410392 A1    12/2018
JP     2004-264920 A     9/2004
(Continued)

OTHER PUBLICATIONS

Communication dated Sep. 24, 2020 from the European Patent Office in application No. 20166702.9.
(Continued)

*Primary Examiner* — Duy M Dang
(74) *Attorney, Agent, or Firm* — Sughrue Mion, PLLC

(57) ABSTRACT

An electronic apparatus includes a memory configured to store a plurality of images; and a processor configured to identify qualities of the plurality of images, process the plurality of images using at least one artificial intelligence model corresponding to the identified qualities, and obtain a graphic image including the processed plurality of images, and the at least one artificial intelligence model is trained to increase a quality of an input image.

18 Claims, 8 Drawing Sheets

(51) Int. Cl.
    *G06T 5/00*     (2006.01)
    *G06N 3/04*     (2006.01)
    *G06N 3/063*    (2006.01)
    *G06T 5/50*     (2006.01)
    *G06N 3/08*     (2006.01)
    *G06N 20/20*    (2019.01)

(52) U.S. Cl.
    CPC ............... *G06N 3/08* (2013.01); *G06N 20/20* (2019.01); *G06T 5/002* (2013.01); *G06T 5/003* (2013.01); *G06T 5/50* (2013.01); *G06T 2207/20081* (2013.01); *G06T 2207/20084* (2013.01)

(58) Field of Classification Search
    CPC ......... G06T 5/003; G06T 5/50; G06T 7/0002; G06T 9/002; G06T 2207/20084; G06T 2207/20172; G06T 2207/20182; H04N 1/32336; H04N 13/0275; H04N 13/0278; H04N 13/0282; G06F 16/583; G06K 9/00201; G06N 20/20; G06N 3/0454; G06N 3/063; G06N 3/08
    See application file for complete search history.

(56)             References Cited

U.S. PATENT DOCUMENTS 8,340,452  B2    12/2012   Marchesotti
    8,483,503  B2     7/2013   Choi et al.
    8,977,076  B2     3/2015   Samadani et al.
    2006/0177152 A1   8/2006   Lin et al.
    2006/0268980 A1*  11/2006  Le Dinh ............... H04N 19/154
                                                            375/240.01
    2014/0119672 A1   5/2014   Ioffe et al.
    2019/0073765 A1   3/2019   Liao et al.
    2020/0005100 A1   1/2020   Kim

FOREIGN PATENT DOCUMENTS

JP            5431754 B2       3/2014
    KR       1993-0018923 A        9/1993
    KR         10-0255636 B1       5/2000
    KR         10-1448308 B1      10/2014
    KR         10-1457741 B1      11/2014
    KR        1020190048196 A      5/2019
    KR        1020190103047 A      9/2019
    KR        1020190104927 A      9/2019
    KR        1020190109820 A      9/2019

OTHER PUBLICATIONS

International Search Report (PCT/ISA/210) and Written Opinion (PCT/ISA/237) dated Aug. 26, 2020 issued by the International Searching Authority in International Application No. PCT/KR2020/004784.

Williams, B., et al., "Fast Blur Detection and Parametric Deconvolution of Retinal Fundus Images", Annual International Conference on the Theory and Applications of Cryptographic Techniques, Sep. 9, 2017, pp. 194-201, XP047439811.

Yu, K., et al., "Crafting a Toolchain for Image Restoration by Deep Reinforcement Learning", 2018 IEEE/CVF Conference on Computer Vision and Pattern Recognition, Jun. 18, 2018, pp. 2443-2452, XP033476210.

* cited by examiner

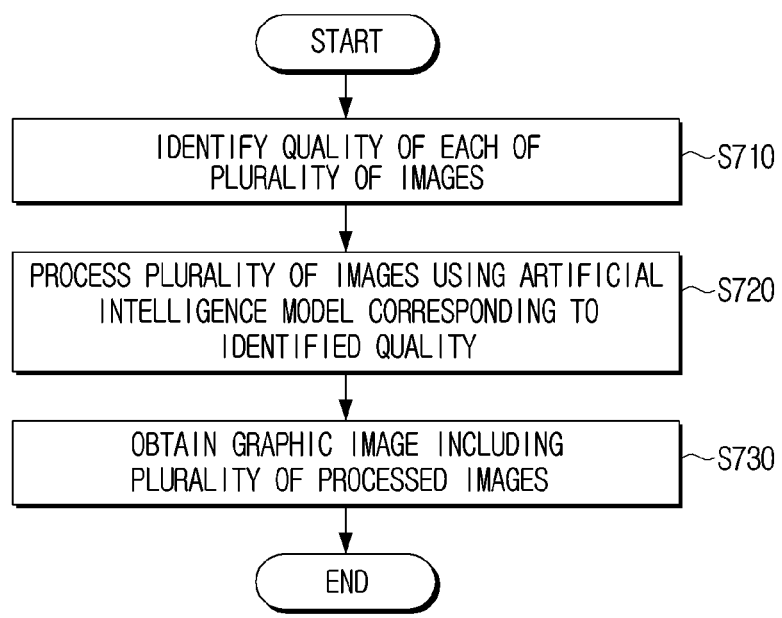

ELECTRONIC APPARATUS AND CONTROL METHOD THEREOF

CROSS-REFERENCE TO RELATED APPLICATION

This application is a continuation application of U.S. patent application Ser. No. 16/842,319, filed on Apr. 7, 2020, which claims priority under 35 U.S.C. § 119 to Korean patent application number 10-2019-0157583, filed on Nov. 29, 2019, in the Korean Intellectual Property Office, the disclosures of which are incorporated herein in their entirety by reference.

BACKGROUND

1. Field

The disclosure is directed to an electronic apparatus and a control method thereof, and more specifically to an electronic apparatus that processes at least one image through an artificial intelligence model and a control method thereof.

2. Description of Related Art

A display apparatus may generate a graphic image including various images, and may display by improving image quality of the graphic image. The various images included in the graphic image may be different in quality from each other, and based on performing an image enhancement processing process, disadvantages such as some image noise being more magnified or sharpness reducing may be generated.

For example, a display apparatus, in order to generate a graphic image including a plurality of thumbnail images of FIG. 1A, may receive an image from each of a plurality of content providers and store the received image in a memory as illustrated in FIG. 1B. Further, a graphics processing unit (GPU) provided in the display apparatus may generate a graphic image including a plurality of images and store in the memory again, the graphic image may then be scaled or compressed to correspond to a resolution of the display apparatus, and may be displayed after performing image quality correction. The image quality correcting process may include a process of removing noise, a process of improving sharpness to compensate for a blurring phenomenon that may occur after the scaling operation, and the like.

The plurality of images received from the plurality of content providers may be different in quality such as an image of high quality and an image of a low quality. Based on applying an image enhancement algorithm to the graphic image including the plurality of images, there may be the problem of enhancing to an optimum image quality not being possible based on the quality of the plurality of images being different. For example, the image enhancement algorithm that removes noise may be advantageous in image enhancement of low quality images but may be disadvantageous is removing high-frequency area of high quality images. In addition, the image enhancement algorithm that raises sharpness may raise sharpness of a high quality image, but may be problematic in further magnifying noise of low quality image.

Accordingly, there is a need to develop a method of enhancing image quality of the graphic image while the plurality of images included in the graphic image maintain a uniform quality.

SUMMARY

Example embodiments address at least the above problems and/or disadvantages and other disadvantages not described above. Also, the example embodiments are not required to overcome the disadvantages described above, and may not overcome any of the problems described above.

Provided are an electronic apparatus for improving image quality of a graphic image including a plurality of images to a uniform quality and a control method thereof.

According to an aspect of an example embodiment, there is provided an electronic apparatus including: a memory configured to store a plurality of images; and a processor configured to: identify qualities of the plurality of images, process the plurality of images using at least one artificial intelligence model corresponding to the identified qualities, and obtain a graphic image comprising the processed plurality of images, wherein the at least one artificial intelligence model is trained to increase a quality of an input image.

The at least one artificial intelligence model may include a first artificial intelligence model trained to reduce noise and a second artificial intelligence model trained to increase sharpness, and the plurality of images may include a first image and a second image, wherein the processor may be configured to: based on identifying that the noise included in the first image is greater than or equal to a threshold noise, use the first artificial intelligence model to process the first image, and based on identifying that the sharpness of the second image is less than a threshold sharpness, use the second artificial intelligence model to process the second image.

The at least one artificial intelligence model may include a third artificial intelligence model and a fourth artificial intelligence model which are trained to reduce noise of different strengths, and wherein the processor may be further configured to process a third image of the plurality of images, using the third artificial intelligence model or the fourth artificial intelligence model based on a strength of noise included in the third image.

The electronic apparatus may further include: a communication interface, wherein the processor may be further configured to: obtain the plurality of images by decoding input data input through the communication interface, store the plurality of images in the memory, and identify the qualities of the plurality of images based on meta data included in the input data.

The electronic apparatus may further include: a display, wherein the processor may be further configured to: process the graphic image to correspond to a resolution of the display, through at least one of a scaling process or an image enhancement process, and control the display to display the processed graphic image.

The processor may include: a first processing unit configured to identify the qualities of the plurality of images; a second processing unit configured to process the plurality of images using the at least one artificial intelligence model corresponding to the identified qualities; a third processing unit configured to obtain the graphic image comprising the processed plurality of images; and a fourth processing unit configured to process the graphic image.

The first processing unit may be a central processing unit (CPU), and the third processing unit is a graphic processing unit (GPU).

The second processing unit may be a neural processing unit (NPU).

The memory may be further configured to store a video content, and the processor may be further configured to obtain a video image by processing the video content, and obtain an output image by mixing the video image and the graphic image.

The plurality of images may be images provided by a plurality of content providers.

According to an aspect of an example embodiment, there is provided a control method of an electronic apparatus, the control method including: identifying qualities of a plurality of images; processing the plurality of images using at least one artificial intelligence model corresponding to the identified qualities, and obtaining a graphic image comprising the processed plurality of images, wherein the at least one artificial intelligence model is trained to increase a quality of an input image.

The at least one artificial intelligence model may include a first artificial intelligence model trained to reduce noise and a second artificial intelligence model trained to increase sharpness, and the plurality of images may include a first image and a second image, wherein the processing may include: processing the first image using the first artificial intelligence model based on identifying that the noise included in the first image is greater than or equal to a threshold noise or more, and processing the second image using the second artificial intelligence model based on identifying that the sharpness of the second image is less than a threshold sharpness.

The at least one artificial intelligence model may include a third artificial intelligence model and a fourth artificial intelligence model which are trained to reduce noise of different strengths. The processing may include processing a third image of the plurality of images using the third artificial intelligence model or the fourth artificial intelligence model based on a strength of noise included in the third image.

The control method may include: receiving input data; and obtaining the plurality of images by decoding the input data, wherein the identifying comprises identifying the qualities of the plurality of images based on meta data included in the input data.

The control method may include: processing the graphic image to correspond to a resolution of a display provided in the electronic apparatus, through at least one of a scaling process or an image enhancement process; and displaying the processed graphic image.

The identifying may include identifying the qualities of the plurality of images by a first processor, wherein the processing the plurality of images using the at least one artificial intelligence model may include processing the plurality of images using the at least one artificial intelligence model corresponding to the identified qualities by a second processor, wherein the obtaining the graphic image may include obtaining the graphic image by a third processor, and wherein the control method may further include processing the graphic image, by a fourth processor, to correspond to a resolution of a display provided in the electronic apparatus.

The processing the plurality of images using the at least one artificial intelligence model may further include a first processing performed by the fourth processor and a second processing that is performed on the plurality of images based on the at least one artificial intelligence model corresponding to the identified qualities.

The second processor may be a neural processing unit (NPU).

The control method may further include: obtaining a video image by processing a video content; and obtaining an output image by mixing the video image and the graphic image.

The plurality of images may be images provided by a plurality of content providers.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 7 is a flow chart for describing a control method of an electronic apparatus according to an embodiment of the disclosure.

DETAILED DESCRIPTION

Figure 1A:
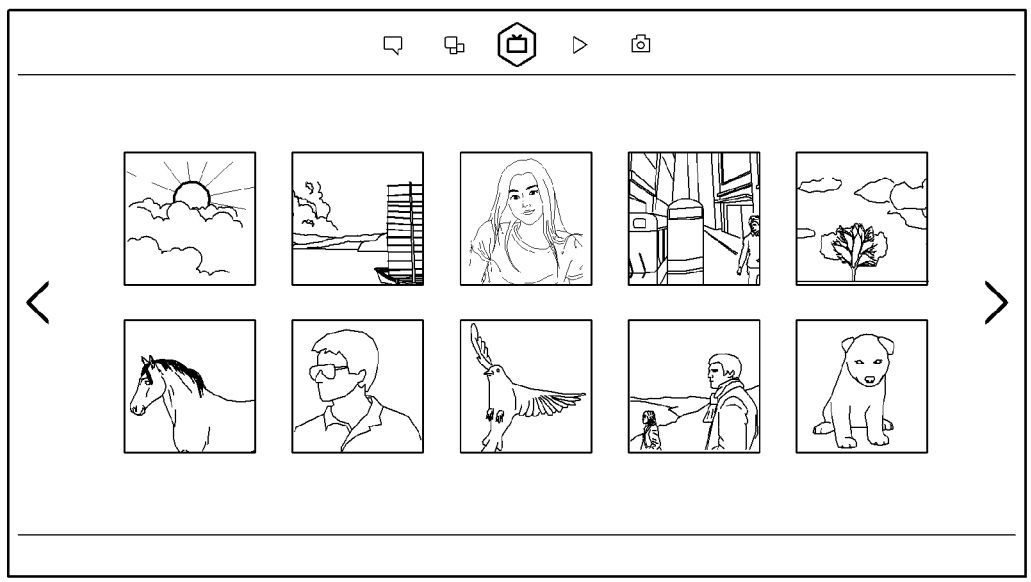
FIG. 1A is a diagram for describing a problem of conventional technology.
Figure 1B:
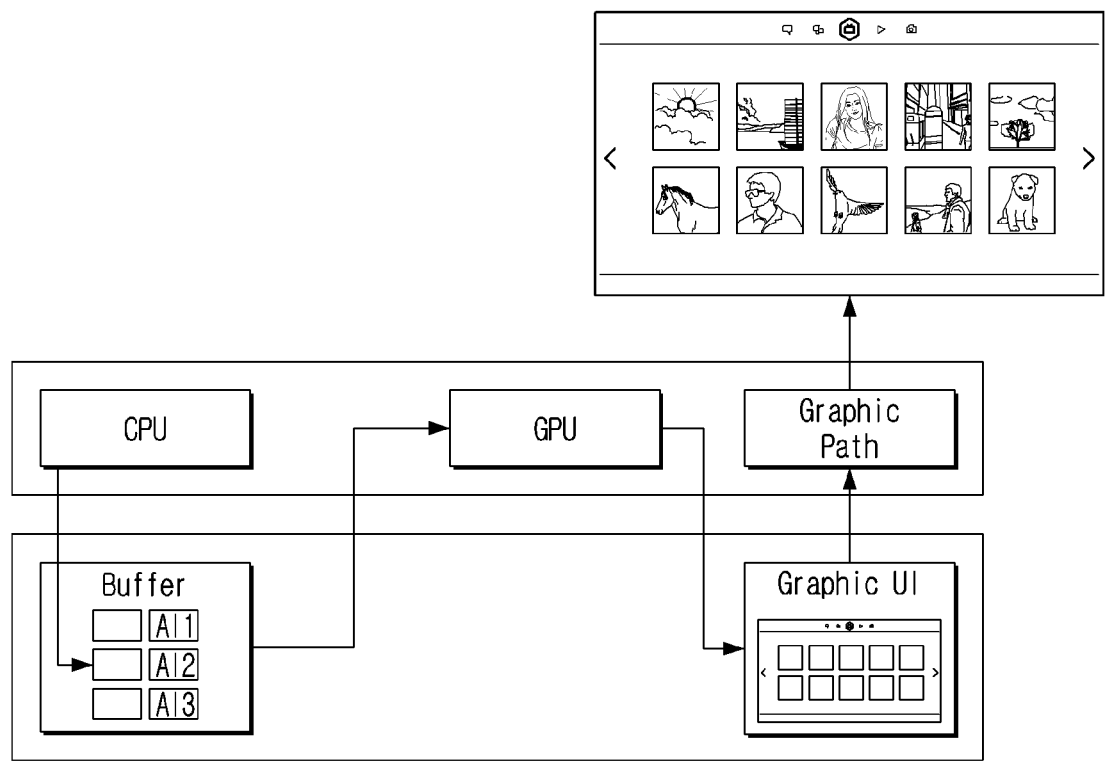
FIG. 1B is a diagram for describing a problem of conventional technology.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

The terms used in the embodiments of the disclosure are general terms selected that are currently widely used considering their function herein. However, the terms may change depending on intention, legal or technical interpretation, emergence of new technologies, and the like of those skilled in the related art. Further, in certain cases, there may be terms arbitrarily selected by the applicant, and this case, the meaning of the term will be disclosed in greater detail in the corresponding description. Accordingly, the terms used herein are not to be construed simply as its designation but based on the meaning of the term and the overall context of the disclosure.

Expressions such as "comprise", "may comprise", "consist", or "may consist of" used herein are to be understood as designating a presence of a characteristic (e.g., elements such as a number, a function, an operation, and a component), and do not exclude the presence of an additional characteristic.

The expression at least one of A and/or B should be understood to represent "A" or "B" or any one of "A and B".

Expressions such as "first", "second", and so on used herein may be used to modify various elements regardless of order and/or importance. Further, it should be noted that the expressions are merely used to distinguish an element from another element and not to limit the relevant elements.

A singular expression includes a plural expression, unless otherwise specified. It is to be understood that the terms such as "comprise" or "consist of" are used herein to designate a presence of a characteristic, number, step, operation, element, component, or a combination thereof, and not to preclude a presence or a possibility of adding one or more of other characteristics, numbers, steps, operations, elements, components or a combination thereof.

In this disclosure, the term "user" may refer to a person using an electronic apparatus or an apparatus (e.g., an artificial intelligence electronic apparatus) using an electronic device.

An embodiment of the disclosure will be described in greater detail below with reference to the attached drawings.

Figure 2:
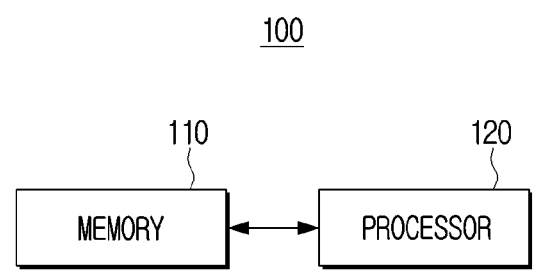
FIG. 2 is a block diagram illustrating a configuration of an electronic apparatus according to an embodiment of the disclosure.

FIG. 2 is a block diagram illustrating a configuration of an electronic apparatus according to an embodiment of the disclosure.

The electronic apparatus 100, as a graphic image obtaining apparatus, may include a display such as a TV, desktop PC, notebook, video wall, large format display (LFD), digital signage, digital information display (DID), projector display, digital video disk (DVD) player, smartphone, tablet PC, monitor, smart glasses, smart watch, and the like, and may be an apparatus that directly displays the obtained graphic image. In addition, the electronic apparatus 100, as an apparatus not provided with a display such as a set-top box (STB), a speaker, and a computer body, may be an apparatus that provides the obtained graphic image to the display apparatus. However, the electronic apparatus 100 is not limited thereto, and may be any apparatus that is capable of obtaining a graphic image.

Referring to FIG. 2, the electronic apparatus 100 may include a memory 110 and a processor 120, but is not limited thereto. The electronic apparatus 100 may be implemented in a form with some configurations excluded.

The memory 110 may store a plurality of images. The plurality of images may be different in quality from each other. For example, the plurality of images may be images provided by each of a plurality of content providers, and the quality thereof may be different from each other.

The memory 110 may store information on various artificial intelligence models. The artificial intelligence model may be an artificial intelligence model trained to improve quality of an input image.

For example, the memory 110 may store information on a first artificial intelligence model trained to reduce noise and information on a second artificial intelligence model trained to improve sharpness. At least one of the first artificial intelligence model or the second artificial intelligence model may be in plurality. For example, the memory 110 may store a plurality of first artificial intelligence models that correspond to different noise strength levels. Based on the noise strength being less than a threshold strength, the first artificial intelligence model 1 may be used, and based on the noise strength being the threshold strength or more, the first artificial intelligence model 2 may be used. In addition, the memory 110 may store the plurality of first artificial intelligence models corresponding to a plurality of different noise types. When an image includes a mosquito type noise, a first artificial intelligence model 3 may be used for the image, and when the image includes a contour type noise, a first artificial intelligence model 4 may be used for the image.

The memory 110 may store an image with each of the plurality of images applied to an artificial intelligence model. For example, the memory 110 may store an image 1 and an image 2. Further, the memory 110 may store image 1' with image 1 applied to the first artificial intelligence model and image 2' with image 2 applied to the second artificial intelligence model.

The memory 110 may further store video content.

The memory 110 may be implemented as a non-volatile memory and a volatile memory, but is not limited thereto. For example, a hard disk may be used in place of the memory 110, and any configuration may be used if the configuration is capable of storing data.

The processor 120 may control the overall operation of the electronic apparatus 100. Specifically, the processor 120 may be connected to each configuration of the electronic apparatus and control the overall operation of the electronic apparatus 100. For example, the processor 120 may be connected to configurations such as the memory 110, the display, a communication interface and the like, and control the operation of the electronic apparatus 100.

According to an embodiment, the processor 120 may be implemented as a digital signal processor (DSP), a microprocessor, and a time controller (TCON), but is not limited thereto. The processor 120 may include one or more of a central processing unit (CPU), a micro controller unit (MCU), a micro processing unit (MPU), a controller, an application processor (AP), a communication processor (CP), or an ARM processor, or may be defined by the corresponding term. In addition, the processor 120 may be implemented as a System on Chip (SOC) or a large scale integration (LSI) embedded with a processing algorithm, and as a form of field programmable gate array (FPGA).

The processor 120 may identify the quality of each of the plurality of images stored in the memory 110. For example, the processor 120 may identify the noise of the first image as an image of a threshold noise or more, and may identify the sharpness of the second image as an image of a threshold sharpness or less.

However, the processor is not limited thereto, and the processor 120 may identify the quality of the image through various methods. For example, the processor 120 may identify a first image that has a noise in a range between a first threshold noise and a second threshold noise, and may identify a second image that has a noise greater than the second threshold noise. Further, the processor 120 may identify the noise type of the first image as a mosquito type image and the noise type of the second image as a contour type image.

The electronic apparatus 100 may further include the communication interface, and the processor 120 may obtain a plurality of images by decoding input data input through the communication interface, store the plurality of images in the memory 110, and identify the quality of each of the plurality of images based on meta data included in the input data.

For example, the processor 120 may obtain meta data from header information of input data received in an encoded state. The meta data may include information on image compressive strength corresponding to input data.

However, the processor 120 is not limited thereto, and may identify the quality of the image through various methods. For example, the processor 120 may identify the quality of the image using an artificial intelligence model trained to identify image quality, and there are no limitations to the methods in identifying image quality. In addition, the processor 120 may further divide the image quality and identify thereof. For example, the processor 120 may identify the image as having an image sharpness of less than the threshold sharpness and including a contour type noise.

The processor 120 may use the artificial intelligence model corresponding to the identified quality of each of the plurality of images and process the same.

For example, the artificial intelligence model may include the first artificial intelligence model trained to reduce noise and the second artificial intelligence model trained to improve sharpness. Further, the processor 120 may, based on the noise included in the first image from a plurality of images being identified as a threshold value or more, process the first image using the first artificial intelligence model, and based on the sharpness of the second image from the plurality of images being identified as less than the threshold sharpness, process the second image using the second artificial intelligence model.

In addition, the artificial intelligence model may include a third intelligence model and a fourth intelligence model trained to reduce noise of different intensities. Further, the processor 120 may, based on the noise strength included in the third image from the plurality of images, use the third artificial intelligence model or the fourth artificial intelligence model to process the third image.

In addition, the artificial intelligence model may include a fifth artificial intelligence model trained to remove a mosquito type noise and a sixth artificial intelligence model trained to remove a contour type noise. Further, the processor 120 may, based on a fifth image from the plurality of images including a mosquito type noise, process the fifth image using a fifth artificial intelligence model, and based on a sixth image from the plurality of images including a contour type noise, process the sixth image using the sixth artificial intelligence model.

In addition, the artificial intelligence model may be divided to a plurality of artificial intelligence models according to image sharpness, and the processor 120 may process the image with the artificial intelligence model that corresponds to the image sharpness.

The quality of image as described above may be divided into various categories, and there are no specific limitations. Further, the processor may apply the plurality of artificial intelligence models according to image quality. For example, the processor 120 may, based on image sharpness being less than the threshold sharpness and including a contour type noise, process an image using the second artificial intelligence model and the six artificial intelligence model sequentially.

In addition, the processor 120 may process an image using a further divided artificial intelligence model. For example, the artificial intelligence model may include an artificial intelligence model that removes the contour type noise and improves sharpness, an artificial intelligence model that removes the contour type noise and maintains sharpness, an artificial intelligence model that removes the mosquito type noise and improves sharpness, and an artificial intelligence model that removes the mosquito type noise and maintains sharpness. Further, the processor 120 may use the artificial intelligence corresponding to the image quality to process the image.

The processor 120 may obtain a graphic image including processed plurality of images. For example, the processor 120 may obtain a graphic image with a plurality of images arranged in matrix form.

The electronic apparatus 100 may further include a display, and the processor 120 may process the graphic image to correspond to a resolution of the display, and control the display to display the processed graphic image. The processing may include at least one of a scaling process or an image enhancement process.

However, the processor is not limited thereto, and the processor 120 may process the graphic image to correspond to the resolution of the external display apparatus and transmit the processed graphic image to the external display apparatus.

The memory 110 may further store a video content, and the processor 120 may process the video content to obtain a video image, and mix the video image and the graphic image to obtain an output image.

The processor 120 may include a first processing unit that identifies the quality of each of the plurality of images, a second processing unit that uses an artificial intelligence model corresponding to the identified quality of each of the plurality of images and processes the same, a third processing unit that obtains a graphic image including the processed plurality of images, and a fourth processing unit that processes the graphic images.

For example, the first processing unit may operate based on an operating system such as a central processing unit (CPU), the second processing unit may be a neural processing unit (NPU), and the third processing unit and the fourth processing unit may perform a predetermined operation. For example, the third processing unit may be a processing unit dedicated to signal processing such as a digital signal processor (DSP) and a graphics processing unit (GPU), and the fourth processing unit may be circuitry performing at least one of scaling or image enhancement.

The neural processing unit (NPU), as a processor dedicated to neural network processing, may include a plurality of processing elements. A one-directional shift or a bidirectional shift may be possible between adjacent processing elements.

Each of the processing elements may generally include a multiplier and an arithmetic logic unit (ALU), and the ALU may include at least one adder. The processing element may perform four fundamental arithmetic operations using the multiplier and the ALU. However, the processing element is not limited thereto, and may be formed in other structures capable of performing the four fundamental arithmetic operations, shifts, and the like. Further, each of the processing elements may include a register for storing data.

The second processing unit may process the each of the plurality of images based on the artificial intelligence model corresponding to the process performed by the fourth processing unit and the identified quality. For example, based on a sharpness improvement performance for compensating a blur phenomenon being superior after the fourth processing unit performs a scaling operation, the second processing unit may use the artificial intelligence model to provide images in high quality. This is due to the possibility of noise increasing based on a low quality image being processed by the fourth processing unit. In addition, based on noise removing performance of the fourth processing unit being superior, the second processing unit may use the artificial intelligence model to provide image in low quality. This is due to the possibility of sharpness reducing as high frequency components are removed based on high quality images being processed by the fourth processing unit.

The processor 120, in the description above, may be described as including a first processing unit to a fourth processing unit, but is not limited thereto. For example, the first processing unit to the fourth processing unit may all be implemented to individual chip types. In addition, the processor 120 may include a first processing unit to a third processing unit, and the display may be implemented to a form including circuitry like the fourth processing unit.

The function related to artificial intelligence according to the disclosure may be operated through the processor 120 and the memory 110.

The processor 120 may consist of one or a plurality of processors. The one or plurality of processors may be a general-purpose processor such as a CPU, an AP, and a DSP, a graphic dedicated processor such as a GPU and a vision processing unit (VPN), or an artificial intelligence dedicated processor such as an NPU.

The one or plurality of processors may, based on pre-defined operation rules stored in the memory 110 and the artificial intelligence model, control to process the input data. In addition, based on the one or plurality of processors being an artificial intelligence dedicated processor, the artificial intelligence dedicated processor may be designed to a hardware structure specializing in processing a specific artificial intelligence model. The pre-defined operation rules or the artificial intelligence model may be characterized by being made through learning.

Being made through learning may refer to a pre-defined operation rule or artificial intelligence model being made to perform a desired characteristic (or, object) as the basic artificial intelligence model is trained using a plurality of learning data by a learning algorithm. The learning may be carried out in the machine itself performing the artificial intelligence according to the disclosure, or through a separate server and/or system. Examples of learning algorithm include supervised learning, unsupervised learning, semi-supervised learning or reinforcement learning, but are not limited thereto.

The artificial intelligence model may consist of a plurality of neural network layers. Each of the plurality of neural network layers may have a plurality of weight values, and perform neural network processing through calculating the calculation result of the previous layer and the calculation between the plurality of weight values. The plurality of weight values held by the plurality of neural network layers may be optimized by the training result of the artificial intelligence model. For example, the plurality of weight values may be renewed for the loss value or the cost value obtained from the artificial intelligence model during the training process be reduced or optimized.

The artificial intelligence network may include a deep neural network (DNN), and a convolutional neural network (CNN), a deep neural network (DNN), a recurrent neural network (RNN), a Restricted Boltzmann Machine (RBM), a deep belief network (DBN), a bidirectional recurrent deep neural network (BRDNN), a generative adversarial network (GAN), a Deep Q-Networks, or the like, for example, may be included therein, but are not limited thereto.

The electronic apparatus 100 may further include a display and a communication interface.

The display may be implemented as various types of display such as a liquid crystal display (LCD), an organic light emitting diode (OLED) display, a plasma display panel (PDP), a micro LED, a laser display, VR, glass or the like. In the display, a driving circuit and a backlight unit, which may be implemented in the form of an a-si TFT, a low temperature poly silicon (LTPS) TFT, an organic TFT (OTFT), and the like may also be included. The display may be implemented as a touch screen coupled with a touch sensor, a flexible display, a three dimensional display (3D display), or the like.

The communication interface may be configured to perform communication with various types of external apparatuses according to the various types of communication methods. The communication interface may include a Wi-Fi module, a Bluetooth module, an infrared communication module, and a wireless communication module. The each of the communication module may be implemented in at least one hardware chip type.

The processor 120 may use the communication interface to perform communication with the various external apparatuses. The external apparatus may include a server, a Bluetooth earphone, a display apparatus, and the like.

The Wi-Fi module and the Bluetooth module may perform communication using Wi-Fi method and Bluetooth method, respectively. Based on using the Wi-Fi module or the Bluetooth module, various connection information such as a service set identifier (SSID) and a session key may be transmitted and received first, and various information may be transmitted and received after communication connection.

The infrared ray communication module may perform communication according to infrared data association (IrDA) technology that transmits data wireless at a close range using infrared ray between visible rays and millimeter waves.

The wireless communication module may include at least one communication chip performing communication according to various communication standards such as Zig-Bee, 3rd generation (3G), $3^{rd}$ generation partnership project (3GPP), long term evolution (LTE), LTE advanced (LTE-A), $4^{th}$ generation (4G), $5^{th}$ generation (5G), or the like, in addition to the communication methods described above.

Other communication interfaces may include at least one of a wired communication module performing communication using a local area network (LAN) module, Ethernet module, a pair cable, a coaxial cable, an optical cable, or the like.

The communication interface may further include an input and output interface. The input and output interface may be any one interface of the high-definition multimedia interface (HDMI), mobile high-definition link (MHL), universal serial bus (USB), display port (DP), Thunderbolt, video graphics array (VGA) port, RGB port, D-subminiature (D-SUB), digital visual interface (DVI), and the like.

The input and output interface may input or output any one of an audio and a video signals.

According to an embodiment, the input and output interface may include a port for inputting and outputting only an audio signal and a separate port for inputting and outputting only a video signal, or may be implemented to one port for inputting and outputting both the audio signal and the video signal.

According to the various embodiments of the disclosure, the electronic apparatus may identify the quality of each of the plurality of images, process each of the plurality of images using the artificial intelligence model corresponding to the identified quality, and based on obtaining the graphic image including the processed plurality of images, maintain a uniform quality of the plurality of images even when image enhancement is carried out on the graphic image.

The operation of the processor 120 will be described in greater detail below through the various drawings. Each of the embodiments in the drawings may be implemented individually, and in a combined form.

Figure 3:
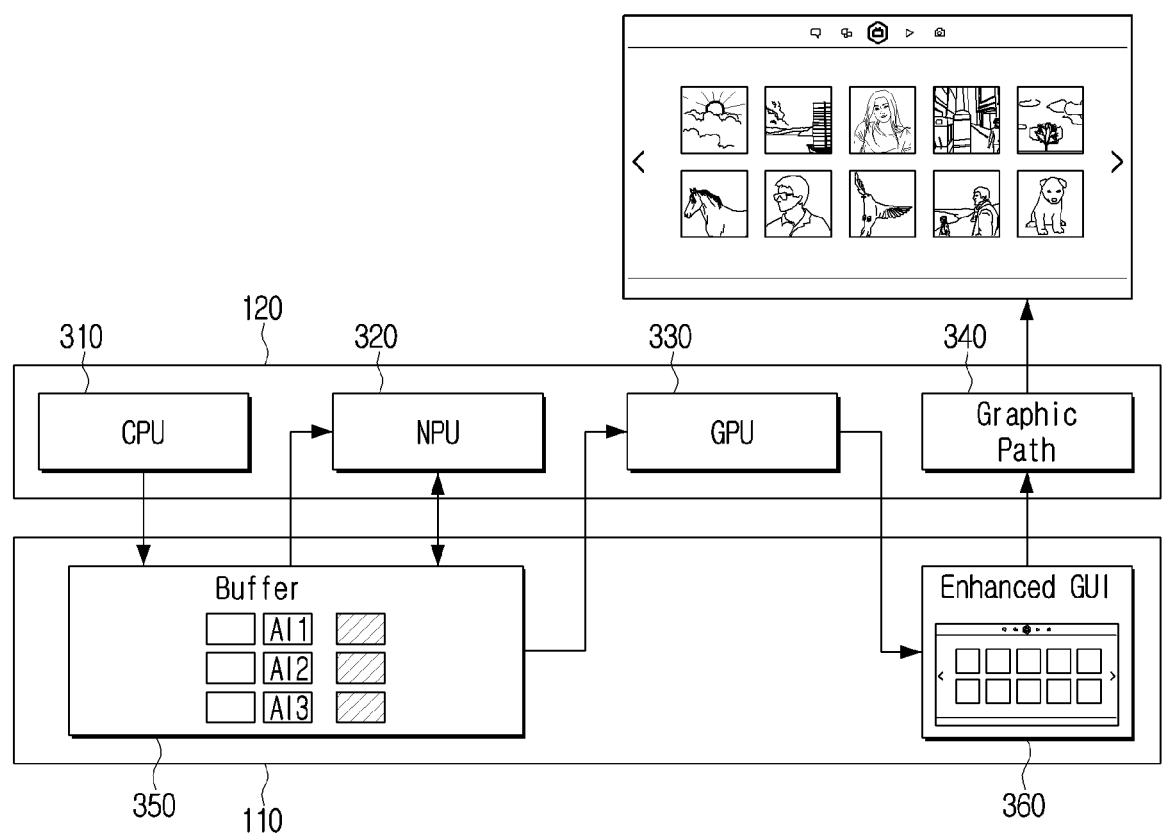
FIG. 3 is a diagram for describing an operation of a processor according to an embodiment of the disclosure.

FIG. 3 is a diagram for describing an operation of a processor according to an embodiment of the disclosure.

As illustrated in FIG. 3, the processor 120 may be implemented in a form with the CPU 310, the NPU 320, the GPU 330, and the graphic path 340 respectively divided. Further, the processor 120 may be implemented as a chip including the CPU 310, the NPU 320, the GPU 330, and the graphic path 340. In an example embodiment, the CPU 310, the NPU 320, the GPU 330, and the graphic path 340 may be implemented as more than one processors.

The memory 110 may include a buffer 350 and an enhanced graphic user interface 360.

The CPU 310 may decode the input data to obtain the plurality of images, and store the obtained plurality of images in the buffer 350. The CPU 310 may obtain meta data from the input data. The meta data may include information on compressive strength of an image corresponding to the input data. The CPU 310 may store information on the compressive strength of the image included in the meta data in the buffer 350.

The buffer 350 may store a plurality of images, information on the compressive strength of each image, and the plurality of artificial intelligence models.

The NPU 320 may process each of the plurality of images stored in the buffer 350 using the artificial intelligence model selected according to information on the corresponding compressive strength. The NPU 320 may process each of the plurality of images using the artificial intelligence model, and may then store the processed plurality of images back in the buffer 350.

The quality of the plurality of images prior to being processed by the NPU 320 may be different from each other, but the quality of the plurality of images processed by the NPU 320 may be similar.

In addition, the NPU 320 may determine the artificial intelligence model for processing each of the plurality of images based on the performance of the graphic path 340. For example, based on the sharpness improvement performance of the graphic path 340 being superior, the NPU 320 may use the artificial intelligence model for providing the plurality of images in high quality. In addition, based on the noise removing performance of the graphic path 340 being superior, the NPU 320 may use the artificial intelligence model for providing the plurality of images in low quality.

The GPU 330 may generate a graphic image including a plurality of images processed by the artificial intelligence model, as the enhanced GUI 360, and store the enhanced GUI 360 in the memory 110.

The graphic path 340 may scale the graphic image to correspond to the display resolution, and perform image enhancement. The image enhancement may include noise removal, sharpness improvement, and the like.

Based on processing the plurality of images to be included in the graphic image prior to generating the graphic image as described above to a uniform quality, the quality of the plurality of images may be maintained uniformly even when image enhancement of the graphic image is carried out.

Figure 4:
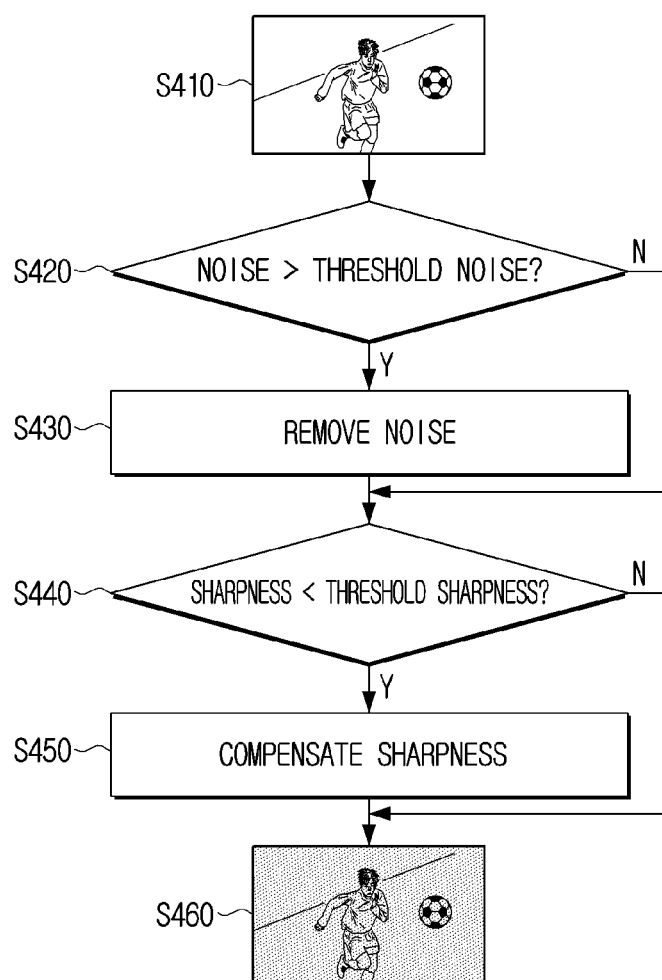
FIG. 4 is a diagram for describing a processing method of a plurality of images according to an embodiment of the disclosure.
Figure 5:
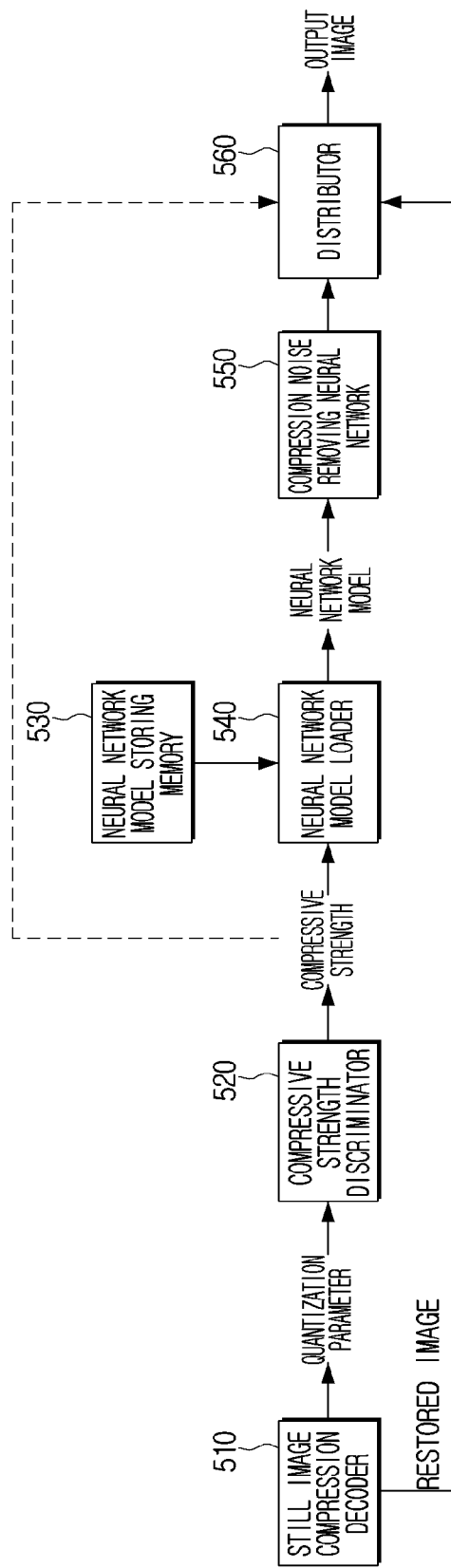
FIG. 5 is a diagram for describing a processing method of a plurality of images according to an embodiment of the disclosure.

FIGS. 4 and 5 are diagrams for describing a processing method of a plurality of images according to an embodiment of the disclosure.

The processor 120 may receive an image in operation S410, and may identify whether the noise of the image exceeds a threshold noise in operation S420. The noise of the image may attribute to a deterioration according to compression. For example, the image may be stored or transmitted according to a JPEG standard still image compression method, and accordingly the presence and absence of noise may be identified from an amount of the JPEG compression.

The removing of compression noise will be first described with reference to FIG. 5. As illustrated in FIG. 5, the electronic apparatus 100 may include a still image compression decoder 510, a compressive strength discriminator 520, a neural network model storing memory 530, a neural network model loader 540, a compression noise removing neural network 550, and a distributor 560. Each of the still image compression decoder 510, the compressive strength discriminator 520, the neural network model loader 540, the compression noise removing neural network 550, and the distributor 560 may be implemented in hardware as one configuration of the processor 120, and implemented in software module to operate according to the software module.

The still image compression decoder 510 may output a plurality of images by decoding the input data. Further, the still image compression decoder 510 may obtain meta data included in the input data in the decoding process. The meta data may include information on image compressive strength corresponding to input data. For example, the meta data may include a quantization parameter.

The still image compression decoder 510 may provide a plurality of images to the distributor 560, and the description thereof will be described below together with the distributor 560.

The compressive strength discriminator 520 may identify compressive strength based on a quantization parameter. For example, the quantization parameter may be divided into a predetermined plurality of sections, the compressive strength per each section may be mapped into numbers and stored, and the compressive strength discriminator 520 may identify the compressive strength of the corresponding number based on the quantization parameter being input.

The neural network model loader 540 may read the artificial intelligence model corresponding to compressive strength from the plurality of artificial intelligence models stored in the neural network model storing memory 530. That is, the artificial intelligence model used according to compressive strength may be varied.

The compression noise removing neural network 550 may process images using the read artificial intelligence model.

The distributor 560 may output one of a decoded image output from the still image compression decoder 510 and the processed image output from the compression noise removing neural network 550 based on the compressive strength. For example, the distributor 560 may, based on the compressive strength being a threshold strength or more, output a processed image output from the compression noise removing neural network 550, and based on the compressive strength being less than the threshold strength, output the decoded image output from the still image compression decoder 510.

The plurality of artificial intelligence models described above may be obtained by learning compression according to each of the compressive strength and restored images.

Referring back to FIG. 4, the processor 120 may, based on the noise exceeding the threshold noise, remove the noise in operation S430. Further, the processor 120 may, based on the noise not exceeding the threshold noise, omit the noise removing operation.

The processor 120 may identify if the image sharpness is less than the threshold sharpness in operation S440. For example, the processor 120 may process images by Fast Fourier Transform (FFT) to identify whether the image sharpness is less than the threshold sharpness based on the frequency component included in the image. For example, based on the image being an upscaled image, a high frequency component from a frequency distribution aspect may be small, and based on the image being an original image, the high frequency component may be high. That is, the processor 120 may identify whether image sharpness is less than the threshold sharpness based on the distribution of the high frequency component.

The processor 120 may compensate for loss of sharpness based on identifying that the image sharpness is less than the threshold sharpness, in operation S450.

The processor 120 may generate an image in which the sharpness is increased and the noise is removed, in operation S460.

In the above, the processor 120 has been described as removing noise and improving sharpness, but the order thereof is not limited thereto. In addition, any one of the noise removal or the sharpness improvement may be performed. Further, at least one of determining the presence and absence of noise and the determining the degree of sharpness may be performed using the artificial intelligence model. For example, the processor 120 may identify whether the image includes noise using the trained artificial intelligence model to identify the presence and absence of noise.

Figure 6:
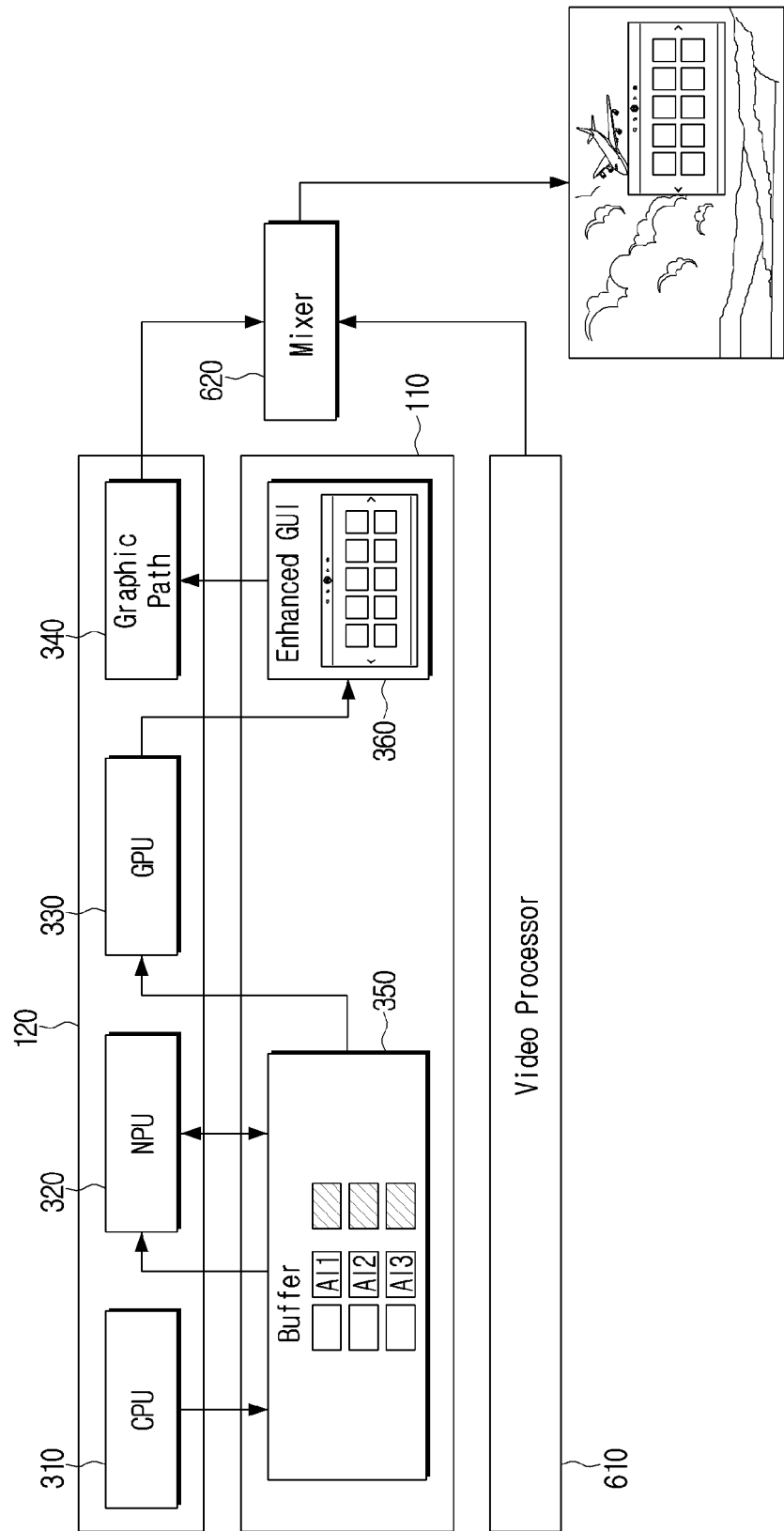
FIG. 6 is a diagram for describing a mixing of a video image and a graphic image according to an embodiment of the disclosure.

FIG. 6 is a diagram for describing a mixing of a video image and a graphic image according to an embodiment of the disclosure. The configuration of obtaining the graphic image from the configurations disclosed in FIG. 6 is the same as that of FIG. 3, and repetitive descriptions will be omitted.

As illustrated in FIG. 6, the electronic apparatus 100 may further include a video processor 610 and a mixer 620. Each of the video processor 610 and the mixer 620 may be implemented in hardware as one configuration in the processor 120, and implemented in software module to operate according to the software module.

The video processor 610, as a type of digital signal processor (DSP), may obtain a video image by processing video content stored in the memory 110.

The mixer 620 may mix the video image output from the video processor 610 and the graphic image output from the graphic path 340 to obtain the output image. The output image may be displayed through the display.

FIG. 7 is a flow chart for describing a control method of an electronic apparatus according to an embodiment of the disclosure.

First, the quality of each of the plurality of images may be identified in operation S710. Next, each of the plurality of images may be processed using the artificial intelligence model corresponding to the identified quality in operation S720. Next, a graphic image including the processed plurality of images may be obtained in operation S730. The artificial intelligence model may be trained to improve the quality of the input image.

The artificial intelligence model may include a first artificial intelligence model trained to reduce noise and a second artificial intelligence model trained to improve sharpness, and operation S720 may include processing a first image using the first artificial intelligence model based on the noise included in the first image from the plurality of images being identified as a threshold noise or more, and processing a second image using the second artificial intelligence model based on the sharpness of the second image from the plurality of images being identified as less than the threshold sharpness.

In addition, the artificial intelligence model may include a third artificial intelligence model and a fourth artificial intelligence model trained to reduce noise of different strengths, and operation S720 may include processing an image using the third artificial intelligence model or the fourth artificial intelligence model based on the noise strength included in the third image from the plurality of images.

Further, the processing may further include receiving the input data and obtaining a plurality of images by decoding input data, and operation S710 may include identifying the quality of each of the plurality of images based on meta data included in the input data.

The identifying may further include processing to correspond to the resolution of the display provided in the electronic apparatus and displaying the processed graphic image, and the processing may include at least one of a scaling process or an image enhancement process.

Operation S710 may include identifying the quality of each of the plurality of images by the first processing unit, operation S720 may include using the artificial intelligence model that corresponds to the identified quality of each of the plurality of images by the second processing unit, operation S730 may include obtaining a graphic image including the processed plurality of images by the third processing unit, and the processing to correspond to the resolution of the display may include processing the graphic image by the fourth processing unit.

Further, operation S720 using the artificial intelligence model may include processing performed by the fourth processing unit and processing each of the plurality of images based on the artificial intelligence model corresponding to the identified quality.

The first processing unit may operate based on the operating system, the second processing unit may be the neural processing unit (NPU), and the third processing unit and the fourth processing unit may perform a predetermined operation.

The obtaining a video image processing the video content, and the obtaining the output image mixing the video image and the graphic image may be further included.

The plurality of images may be images provided by a plurality of content providers.

According to the various embodiment of the disclosure as described above, the electronic apparatus may identify the quality of each of the plurality of images, process each of the plurality of images using the artificial intelligence model corresponding to the identified quality, and based on obtaining the graphic image including the processed plurality of images, maintain a uniform quality of the plurality of images even when image enhancement of the graphic image is carried out.

According to an embodiment, the various embodiments described above may be implemented as a software including instructions stored on machine-readable storage media readable by a machine (e.g., a computer). The machine, as an apparatus capable of calling an instruction stored in a storage medium and operating according to the called instruction, may include an electronic apparatus (e.g., an electronic apparatus (A)) according to the disclosed embodiments. Based on instructions being executed by the processor, the processor may directly, or using other elements under the control of the processor, perform a function corresponding to the instruction. The instruction may include a code generated by a compiler or a code executed by an interpreter. The machine-readable storage medium may be provided in the form of a non-transitory storage medium. 'Non-transitory' used herein only denotes that a storage medium does not include a signal and is tangible, but does not distinguish data being semi-permanently or temporarily stored in a storage medium.

Further, according to an embodiment, the method according to the various embodiments described above may be provided in a computer program product. The computer program product may be exchanged between a seller and a purchaser as a commodity. The computer program product may be distributed in the form of a machine-readable storage medium (e.g., a compact disc read only memory (CD-ROM)) or distributed online through an application store (e.g., PlayStore™). In the case of on-line distribution, at least a portion of the computer program product may be at least temporarily stored in a storage medium such as a manufacturer's server, a server of an application store, or a memory of a relay server, or temporarily generated.

In addition, according to an embodiment, the various embodiments described above may be implemented in a recordable medium which is readable by computer or an apparatus similar to computer using software, hardware, or the combination of software and hardware. In some cases, the embodiments described herein may be implemented by the processor itself. Based on a software implementation, the embodiments such as the procedures and functions described herein may be implemented with separate software modules. Each of the software modules may perform one or more of the functions and operations described herein.

The computer instructions for performing the processing operations of apparatuses according to the various embodiments described above may be stored in a non-transitory computer-readable medium. The computer instructions stored in this non-transitory computer-readable medium cause the specific apparatus to perform the processing operations in the apparatus according to the above-described various embodiments when executed by the processor of the specific apparatus. The non-transitory computer readable medium refers to a medium that stores data semi-permanently rather than storing data for a very short time, such as a register, a cache, a memory or etc., and is readable by an apparatus. Specific examples of the non-transitory computer readable medium include a compact disc (CD), a digital versatile disc (DVD), a hard disc, a Blu-ray disc, a universal serial bus (USB), a memory card, a read only memory (ROM), and the like.

In addition, each of the elements (e.g., a module or a program) according to the various embodiments described above may be composed of a single entity or a plurality of entities, and some sub-elements of the abovementioned sub-elements may be omitted, or another sub-element may be further included in various embodiments. Alternatively or additionally, some elements (e.g., modules or programs) may be integrated into one entity to perform the same or similar functions performed by each respective element prior to integration. The operations performed by a module, a program, or other element, in accordance with the various embodiments, may be performed sequentially, in a parallel, repetitively, or in a heuristically manner, or at least some operations may be performed in a different order, omitted, or may further include a different operation.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An electronic apparatus comprising:
   a memory configured to store a plurality of images and at least two artificial intelligence models trained to increase a quality of an input image;
   a first processor configured to identify different qualities of the plurality of images;
   a second processor configured to process the plurality of images using the at least two artificial intelligence models corresponding to the identified different qualities;
   a third processor configured to obtain a graphic image including the processed plurality of images received from the second processor; and
   a fourth processor configured to process the graphic image so that the processed graphic image is displayed on a display of the electronic apparatus.

2. The electronic apparatus of claim 1, wherein the at least two artificial intelligence models comprise a first artificial intelligence model trained to reduce noise and a second artificial intelligence model trained to increase sharpness, and the plurality of images comprises a first image and a second image,
   wherein the second processor is further configured to:
      based on the noise included in the first image being greater than or equal to a threshold noise, use the first artificial intelligence model to process the first image, and
      based on the sharpness of the second image being less than a threshold sharpness, use the second artificial intelligence model to process the second image.

3. The electronic apparatus of claim 1, wherein the at least two artificial intelligence models comprise a third artificial intelligence model and a fourth artificial intelligence model which are trained to reduce noise of different strengths, and
   wherein the second processor is further configured to process a third image of the plurality of images, using the third artificial intelligence model or the fourth artificial intelligence model based on a strength of noise included in the third image.

4. The electronic apparatus of claim 1, further comprising:
   a communication interface,
   wherein the first processor is further configured to:
      obtain the plurality of images by decoding input data input through the communication interface,
      store the plurality of images in the memory, and
      identify the different qualities of the plurality of images based on meta data included in the input data.

5. The electronic apparatus of claim 1, further comprising:
   the display,
   wherein the fourth processor is further configured to:
      process the graphic image to correspond to a resolution of the display, through at least one of a scaling process or an image enhancement process.

6. The electronic apparatus of claim 1, wherein the first processor is a central processing unit (CPU), the second processor is a neural processing unit (NPU), and the third processor is a graphic processing unit (GPU).

7. The electronic apparatus of claim 1, wherein the memory is further configured to store a video content, and the electronic apparatus further comprising:
   a video processor configured to obtain a video image by processing the video content; and
   a mixer configured to obtain an output image by mixing the video image and the graphic image.

8. The electronic apparatus of claim 1, wherein the plurality of images are images provided by a plurality of content providers.

9. The electronic apparatus of claim 1, wherein the different qualities comprise a first quality and a second quality that are different from each other, and
the second processor is further configured to process the plurality of images using the at least two artificial intelligence models comprising a first artificial intelligence model corresponding to the first quality, and a second artificial intelligence model corresponding to the second quality.

10. The electronic apparatus of claim 1, wherein the third processor is further configured to receive, from the second processor, the plurality of images that are processed by the second processor, and output the graphic image including the plurality of images that are processed by the second processor.

11. A control method of an electronic apparatus, the control method comprising:
identifying different qualities of a plurality of images by a first processor;
processing the plurality of images using at least two artificial intelligence models, which are trained to increase a quality of an input image, corresponding to the identified different qualities by a second processor;
obtaining a graphic image including the processed plurality of images received from the second processor, by a third processor;
processing the graphic image by a fourth processor; and
displaying the processed graphic image.

12. The control method of claim 11, wherein the at least two artificial intelligence models comprise a first artificial intelligence model trained to reduce noise and a second artificial intelligence model trained to increase sharpness, and the plurality of images comprises a first image and a second image
wherein the processing the plurality of images comprises:
processing the first image using the first artificial intelligence model based on the noise included in the first image being greater than or equal to a threshold noise, and
processing the second image using the second artificial intelligence model based on the sharpness of the second image being less than a threshold sharpness.

13. The control method of claim 11, wherein the at least two artificial intelligence models comprise a third artificial intelligence model and a fourth artificial intelligence model which are trained to reduce noise of different strengths, and
wherein the processing the plurality of images comprises processing a third image of the plurality of images using the third artificial intelligence model or the fourth artificial intelligence model based on a strength of noise included in the third image.

14. The control method of claim 11, further comprising:
receiving input data; and
obtaining the plurality of images by decoding the input data by the first processor,
wherein the identifying comprises identifying the different qualities of the plurality of images based on meta data included in the input data.

15. The control method of claim 11, wherein the processing the graphic image comprises processing the graphic image to correspond to a resolution of a display provided in the electronic apparatus, through at least one of a scaling process or an image enhancement process.

16. The control method of claim 11, wherein the processing the plurality of images comprises a first processing performed by the fourth processor and a second processing that is performed on the plurality of images based on the at least two artificial intelligence models corresponding to the identified different qualities.

17. The control method of claim 11, further comprising:
obtaining a video image by processing a video content; and
obtaining an output image by mixing the video image and the graphic image.

18. The control method of claim 11, wherein the plurality of images are images provided by a plurality of content providers.

* * * * *